US012767121B2

(12) United States Patent
Nobutoki et al.

(10) Patent No.: US 12,767,121 B2
(45) Date of Patent: Oct. 20, 2026

(54) AUTONOMOUS MOBILE BODY

(71) Applicant: AISIN CORPORATION, Kariya (JP)

(72) Inventors: Masashi Nobutoki, Aichi-ken (JP); Shintaro Suzuki, Aichi-ken (JP); Tetsuhiro Maki, Aichi-ken (JP); Wataru Takayanagi, Aichi-ken (JP); Toshihiko Ishida, Aichi-ken (JP)

(73) Assignee: AISIN CORPORATION, Kariya (JP)

( * ) Notice: Subject to any disclaimer, the term of this patent is extended or adjusted under 35 U.S.C. 154(b) by 20 days.

(21) Appl. No.: 18/910,214

(22) Filed: Oct. 9, 2024

(65) Prior Publication Data

US 2025/0128697 A1 Apr. 24, 2025

(30) Foreign Application Priority Data

Oct. 23, 2023 (JP) ................................. 2023-181618

(51) Int. Cl.

| | |
|---|---|
| ***B60W 30/02*** | (2012.01) |
| ***B60W 10/04*** | (2006.01) |
| ***B60W 10/30*** | (2006.01) |
| ***B60W 60/00*** | (2020.01) |

(52) U.S. Cl.

CPC ............ *B60W 30/02* (2013.01); *B60W 10/04* (2013.01); *B60W 10/30* (2013.01); *B60W 60/00* (2020.02)

(58) Field of Classification Search

CPC ...... B60W 30/02; B60W 10/04; B60W 10/30; B60W 10/00; G05D 1/24; G05D 1/498; G05D 1/43; G05D 1/622; G05D 2105/28; G05D 2109/10; G05D 2111/52; B25J 5/007

See application file for complete search history.

(56) References Cited

U.S. PATENT DOCUMENTS

| | | | | |
|---|---|---|---|---|
| 11,209,887 | B1 * | 12/2021 | Jung .................... | G05D 1/0005 |
| 2006/0097683 | A1 * | 5/2006 | Hosoda ................ | B62K 11/007 318/568.12 |
| 2021/0008710 | A1 * | 1/2021 | Kiyosawa .............. | B25J 9/1035 |
| 2024/0075628 | A1 * | 3/2024 | Iwanaga ................ | B25J 9/1697 |

FOREIGN PATENT DOCUMENTS

| | | | |
|---|---|---|---|
| JP | 2023-104439 A | | 7/2023 |
| JP | 2023112721 A | * | 8/2023 |

* cited by examiner

*Primary Examiner* — Nhi Q Bui
(74) *Attorney, Agent, or Firm* — Sughrue Mion, PLLC

(57) ABSTRACT

An autonomous mobile body includes: a traveling unit includes a drive wheel and a chassis and configured to travel straight forward and backward and turn left and right; an upper unit disposed at an upper portion of the traveling unit and including a vibration damping mechanism configured to damp a vibration caused by the straight traveling and the turning of the traveling unit; a first control unit configured to control the traveling unit; and a second control unit configured to control the upper unit. The first control unit and the second control unit acquire information indicating motion states of each other's units, and control the traveling unit and the upper unit such that the units operate in conjunction with each other based on the acquired information.

4 Claims, 7 Drawing Sheets

AUTONOMOUS MOBILE BODY

CROSS REFERENCE TO RELATED APPLICATIONS

This application is based on and claims priority under 35 U.S.C. § 119 to Japanese Patent Application 2023-181618, filed on Oct. 23, 2023, the entire content of which is incorporated herein by reference.

TECHNICAL FIELD

This disclosure relates to an autonomous mobile body.

BACKGROUND DISCUSSION

An autonomous mobile body such as a robot that is autonomously movable has been developed. The autonomous mobile body includes a traveling unit including drive wheels and the like, and includes, for example, an upper unit including a mechanism for damping a vibration caused by the traveling unit traveling.

For example, a delivery robot in JP 2023-104439A (Reference 1) includes a rocking mechanism that rockably supports a placement portion on which a delivery item is placed, thereby damping a vibration caused by the delivery robot traveling.

However, depending on a traveling state of the traveling unit, vibrations cannot be sufficiently damped. Motion of the upper unit caused by the mechanism for damping the vibration may affect the traveling unit.

A need thus exists for an autonomous mobile body which is not susceptible to the drawback mentioned above.

SUMMARY

An autonomous mobile body according to the present embodiment includes: a traveling unit including a drive wheel and a chassis and configured to travel straight forward and backward and turn left and right; an upper unit disposed at an upper portion of the traveling unit and including a vibration damping mechanism configured to damp a vibration caused by the straight traveling and the turning of the traveling unit; a first control unit configured to control the traveling unit; and a second control unit configured to control the upper unit, in which the first control unit and the second control unit acquire information indicating motion states of each other's units, and control the traveling unit and the upper unit such that the units operate in conjunction with each other based on the acquired information.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an autonomous traveling robot according to the present embodiment will be described with reference to the drawings. In the following description, "front-rear (direction)" indicates a direction parallel to a traveling direction of the autonomous traveling robot. "Left-right (direction)" is a direction perpendicular to the traveling direction of the autonomous traveling robot and parallel to a ground.

Configuration Example of Autonomous Traveling Robot

Figure 1B:
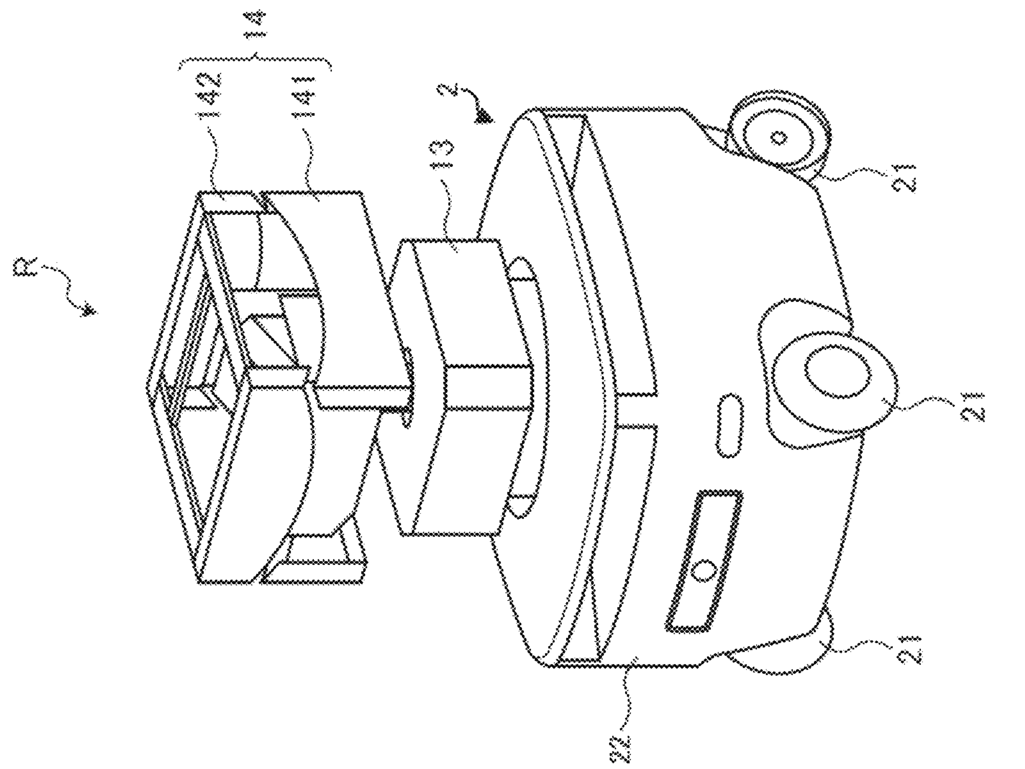
FIGS. 1A and 1B are diagrams showing an example of a structure of an autonomous traveling robot according to an embodiment.
Figure 1A:
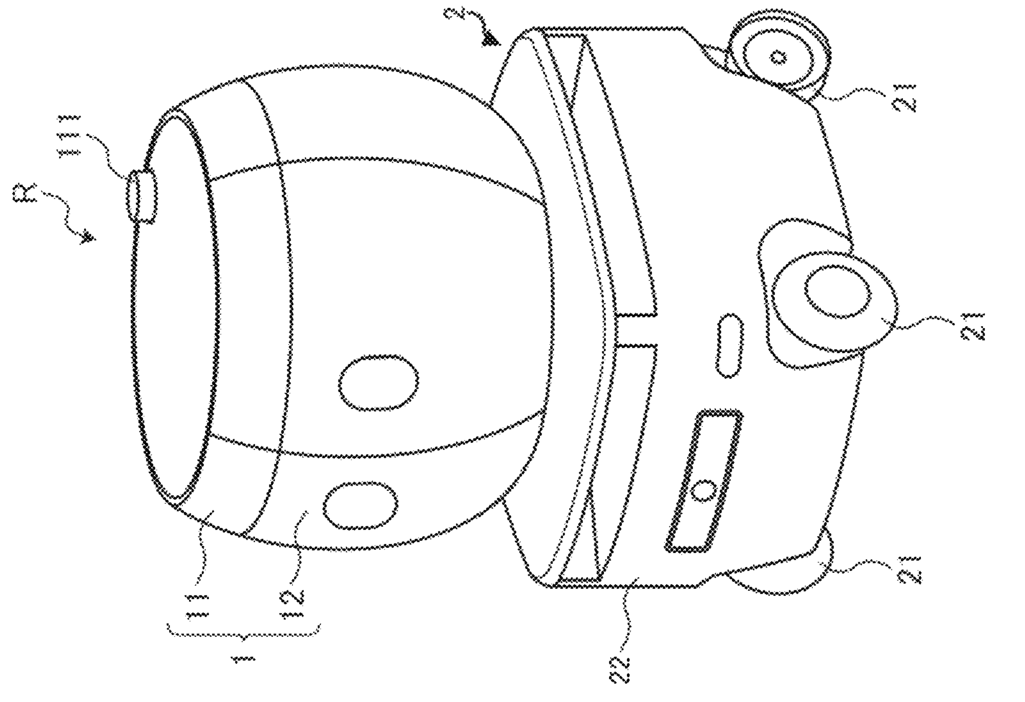

FIGS. 1A and 1B are diagrams showing an example of a structure of an autonomous traveling robot R according to an embodiment. More specifically, FIG. 1A shows an example of an appearance of the autonomous traveling robot R. FIG. 1B shows an example of an internal structure of an upper unit 1 of the autonomous traveling robot R. That is, in FIG. 1B, a housing portion of a top plate 11 and a housing portion of a main body 12 in FIG. 1A are not shown.

As shown in FIG. 1A, the autonomous traveling robot R includes the upper unit 1 and a traveling unit 2. The traveling unit 2 has, for example, a rounded rectangular parallelepiped shape, includes four drive wheels 21 and a chassis 22, and is capable of traveling straight and turning left and right. The upper unit 1 has, for example, a barrel shape and is disposed at an upper portion of the traveling unit 2, and includes the top plate 11 and the main body 12.

The top plate 11 of the upper unit 1 is configured to perform pendulum motion independently of the main body 12. According to such pendulum motion, the top plate 11 can damp a vibration that occurs in the upper unit 1 when the traveling unit travels. Accordingly, the autonomous traveling robot R can place and transport food, drink, luggage, or the like, or can place and display flowers disposed in a vase or decorative items such as objets d'art on the top plate 11. A mark 111 is provided on an upper surface of the top plate 11, which serves as a reference when placing such transported items or decorative items. The top plate 11 can make a gesture to people around by tilting at a predetermined angle by the pendulum motion, for example.

The main body 12 of the upper unit 1 is configured to be rotatable about an axis in an upper-lower direction of the autonomous traveling robot R, independently of the top plate 11. Accordingly, for example, by providing the main body 12 with a decoration resembling a face, it is possible to make a gesture such as turning a face portion towards people around.

According to the above function, the autonomous traveling robot R can travel autonomously within a mobile environment such as a restaurant, a house, a facility, a warehouse, a factory, or an outdoor, and can perform a transport operation, a display of a decorative item, communication with people around, and the like. The autonomous traveling robot R is an example of an autonomous mobile body.

As shown in FIG. 1B, the upper unit 1 includes a rotation mechanism 13 and a pendulum mechanism 14.

The rotation mechanism 13 is disposed inside the main body 12 of the upper unit 1 and is capable of causing the main body 12 to perform oscillating motion around a vertical axis with the traveling unit 2 as a reference.

The pendulum mechanism 14 is disposed inside the top plate 11 of the upper unit 1 and includes a front-rear pendulum mechanism 141 and a left-right pendulum mechanism 142.

The front-rear pendulum mechanism 141 tilts the top plate 11 in the front-rear direction. Thus, by tilting the top plate 11 in the front-rear direction, for example, it is possible to damp vibrations in the front-rear direction caused by the traveling unit 2 traveling forward and backward. By tilting the top plate 11 in the front-rear direction, for example, it is possible to make a gesture such as looking up at people around or nodding to greet people around. The left-right pendulum mechanism 142 tilts the top plate 11 in the left-right direction. Thus, by tilting the top plate 11 in the left-right direction, for example, it is possible to damp a vibration in the left-right direction caused by the traveling unit 2 turning left and right. By tilting the top plate 11 in the left-right direction, for example, it is possible to make a gesture such as tilting a head.

Thus, the pendulum mechanism 14 that damps the vibration occurring in the upper unit 1 is an example of a vibration damping mechanism. If it is possible to damp the vibration of the upper unit 1, the autonomous traveling robot R may include a vibration damping mechanism that is different from the pendulum mechanism 14 that damps a vibration by pendulum motion.

Figure 2:
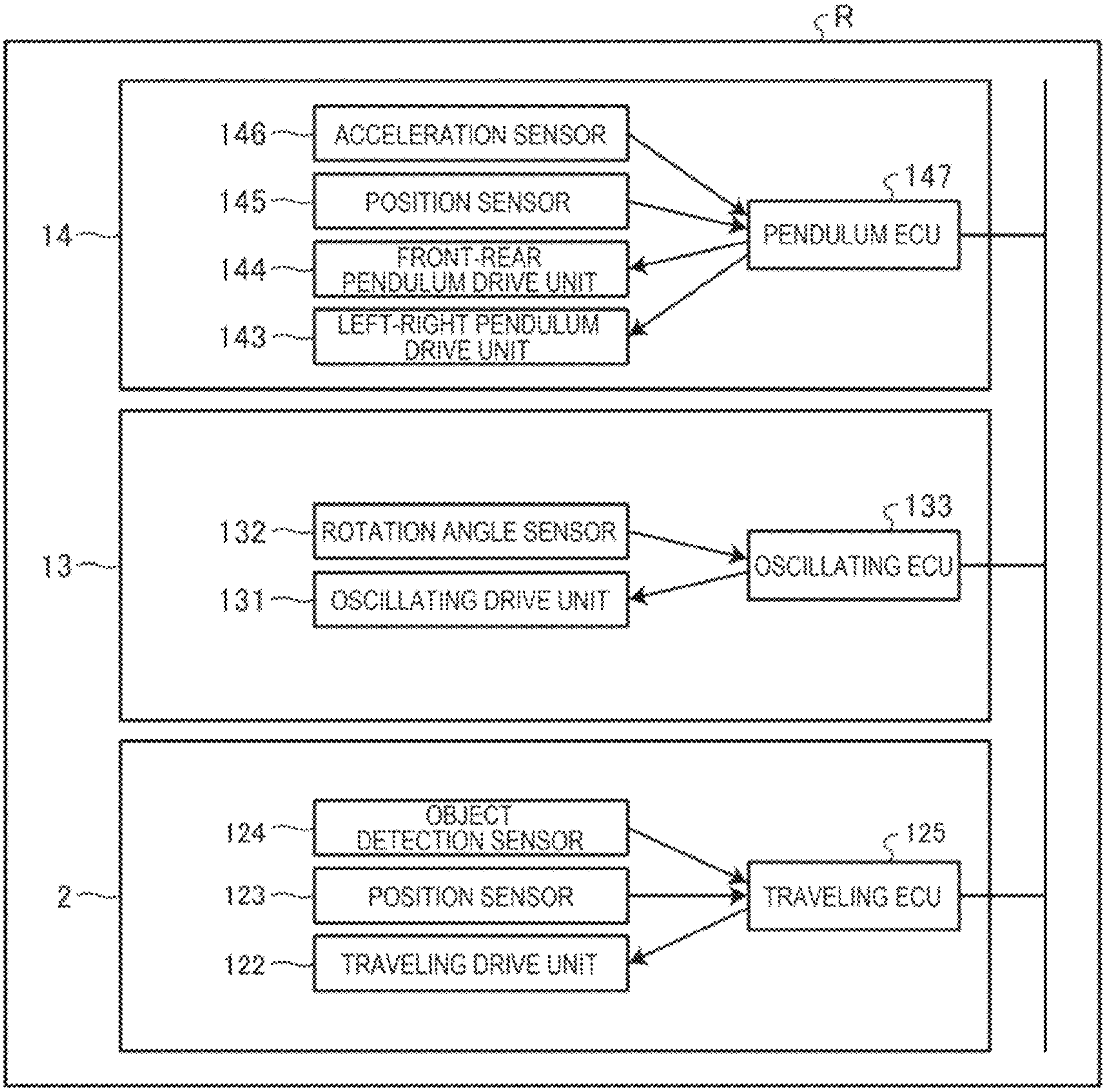
FIG. 2 is a block diagram showing an example of a functional configuration of the autonomous traveling robot according to the embodiment.

FIG. 2 is a block diagram showing an example of a functional configuration of the autonomous traveling robot R according to the embodiment.

As shown in FIG. 2, the top plate 11 and the main body 12 of the upper unit 1 and the traveling unit 2 are respectively controlled by a pendulum electronic control unit (ECU) 147, an oscillating ECU 133, and a traveling ECU 125.

Each of the pendulum ECU 147, the oscillating ECU 133, and the traveling ECU 125 is an information processing device implemented using predetermined hardware and software, and is implemented using, for example, a central processing unit (CPU), a memory, a field programmable gate array (FPGA), and an application specific integrated circuit (ASIC).

The pendulum ECU 147, the oscillating ECU 133, and the traveling ECU 125 can communicate with each other by a controller area network (CAN) or the like and transmit and receive various kinds of information.

The pendulum ECU and the oscillating ECU 133 that respectively control the top plate 11 and the main body 12 of the upper unit 1 are an example of a second control unit. The traveling ECU that controls the traveling unit 2 is an example of a first control unit.

The traveling unit 2 includes a traveling drive unit 122, a position sensor 123, an object detection sensor 124, and the traveling ECU 125.

The traveling drive unit 122 includes an electric motor that rotationally drives the drive wheels 21.

The position sensor 123 is a sensor that acquires data for estimating a position of the autonomous traveling robot R by the traveling ECU 125. The position sensor 123 is implemented by, for example, a global positioning system (GPS) sensor that acquires position information on the autonomous traveling robot R, and a sensor that acquires information such as a turning angle and a rotation angular velocity of the drive wheel 21, and transmits a detection signal to the traveling ECU 125.

The object detection sensor 124 is a sensor that detects an object such as an obstacle around the autonomous traveling robot R. The object detection sensor 124 is implemented by, for example, light detection and ranging (LiDAR), or a millimeter wave sensor, and transmits a detection signal to the traveling ECU 125. The object detection sensor 124 may also be implemented by a camera, an ultrasonic sensor, an infrared sensor, or the like. Alternatively, the object detection sensor 124 may be implemented by combining a plurality of sensing mechanisms.

The traveling ECU 125 executes various kinds of control in the traveling unit 2. For example, the traveling ECU 125 estimates a current position of the autonomous traveling robot R based on a detection signal acquired from the position sensor 123. The traveling ECU 125 recognizes an obstacle around the autonomous traveling robot R based on a detection signal acquired from the object detection sensor 124.

The traveling ECU 125 generates a travel route from a current position to a destination based on the current position, the destination, and a position of the obstacle. The traveling ECU 125 controls the traveling drive unit 122 to cause the traveling unit 2, and thus the autonomous traveling robot R to travel along the travel route.

The rotation mechanism 13 provided in the main body 12 of the upper unit 1 includes an oscillating drive unit 131, a rotation angle sensor 132, and the oscillating ECU 133.

The oscillating drive unit 131 includes an actuator that rotationally moves the rotation mechanism 13.

The rotation angle sensor 132 is a sensor that detects a rotation angle of the rotation mechanism 13 and transmits a detection signal to the oscillating ECU 133.

The oscillating ECU 133 executes various kinds of control in the main body 12 of the upper unit 1. For example, when the traveling ECU 125 recognizes that there is a person around the autonomous traveling robot R based on the object detection sensor 124, the oscillating ECU 133, which receives information from the traveling ECU 125 indicating that the person is recognized, makes a gesture of turning a decorative portion of the main body 12, which resembles a face, toward the person.

The pendulum mechanism 14 provided on the top plate 11 of the upper unit 1 includes a left-right pendulum drive unit 143, a front-rear pendulum drive unit 144, a position sensor 145, an acceleration sensor 146, and the pendulum ECU 147.

The left-right pendulum drive unit 143 drives the left-right pendulum mechanism 142 to cause the top plate 11 to perform pendulum motion in the left-right direction as described above. For example, when the autonomous traveling robot R turns in the left-right direction, the autonomous traveling robot R is accelerated in the left-right direction. Due to this effect, the upper unit 1 may vibrate in a manner that causes the upper unit 1 to sway in the left-right direction. When a transported item, a decorative item, or the like is placed on the top plate 11, the objects may shift or fall in the left-right direction. The left-right pendulum drive unit 143 causes pendulum motion that tilts the top plate 11 in the left-right direction, for example, so as to cancel out an effect of acceleration caused by the turning of the autonomous traveling robot R.

The front-rear pendulum drive unit 144 drives the front-rear pendulum mechanism 141 to cause the top plate 11 to perform pendulum motion in the front-rear direction as described above. For example, when the autonomous traveling robot R travels forward and backward, the autonomous traveling robot R is accelerated in the front-rear direction. Due to this effect, the upper unit 1 may vibrate in a manner that causes the upper unit 1 to sway in the front-rear direction. When a transported item, a decorative item, or the like is placed on the top plate 11, the objects may shift or fall in the front-rear direction. The front-rear pendulum drive unit 144 causes pendulum motion that tilts the top plate 11 in the front-rear direction, for example, so as to cancel out an effect of acceleration caused by traveling of the autonomous traveling robot R in the front-rear direction.

The left-right pendulum drive unit 143 and the front-rear pendulum drive unit 144 can be controlled in parallel. Therefore, regardless of a direction in which acceleration occurs within 360 degrees around the autonomous traveling robot R, a vibration occurring in the upper unit 1 can be damped by controlling the left-right pendulum drive unit 143 and the front-rear pendulum drive unit 144 in parallel so as to cancel out an effect of the acceleration.

As described above, the left-right pendulum drive unit 143 and the front-rear pendulum drive unit 144 cause the top plate 11 to perform pendulum motion in the front-rear direction and in the left-right direction, thereby enabling the autonomous traveling robot R to make gestures such as looking up, nodding, greeting, or tilting the head to people around the autonomous traveling robot R.

The position sensor 145 is a sensor that acquires data for the pendulum ECU 147 to estimate a position of the pendulum mechanism 14. The position sensor 145 is implemented by, for example, a rotation angular velocity sensor, and transmits a detection signal to the pendulum ECU 147. The position sensor 145 may be provided for each of the front-rear pendulum mechanism 141 and the left-right pendulum mechanism 142 so as to be able to individually detect pendulum motion in the front-rear direction and pendulum motion in the left-right direction.

The acceleration sensor 146 detects acceleration occurred in the pendulum mechanism 14 and transmits a detection signal to the pendulum ECU 147.

The pendulum ECU 147 executes various kinds of control in the top plate 11 of the upper unit 1. Based on detection signals acquired from the position sensor 145 and the acceleration sensor 146, the pendulum ECU 147 controls the left-right pendulum drive unit 143 and the front-rear pendulum drive unit 144 to cause the top plate 11 to perform pendulum motion so as to damp a vibration caused by acceleration occurred in the autonomous traveling robot R.

When the pendulum ECU 147, the oscillating ECU 133, and the traveling ECU 125 described above include a CPU or the like, various functions of the pendulum ECU 147, the oscillating ECU 133, and the traveling ECU 125 described above are implemented by the CPU executing a predetermined program.

Thus, the program executed by the autonomous traveling robot R is provided in a form of an installable or executable file recorded on a recording medium readable by a computer device, such as a compact disc (CD)-read only memory (ROM), a flexible disk (FD), a CD-recordable (R), or a digital versatile disk (DVD). The program may be provided or distributed via a network such as the Internet.

Control Example of Autonomous Traveling Robot

Next, a control method of the autonomous traveling robot R using the pendulum ECU 147, the traveling ECU 125, and the like will be described with reference to FIGS. 3A to 4. As described above, the pendulum ECU 147 and the traveling ECU 125 are configured to communicate with each other, for example, via a CAN, and cooperate with each other to control the upper unit 1 and the traveling unit 2 so that the upper unit 1 and the traveling unit 2 operate in conjunction with each other.

Figure 3A:
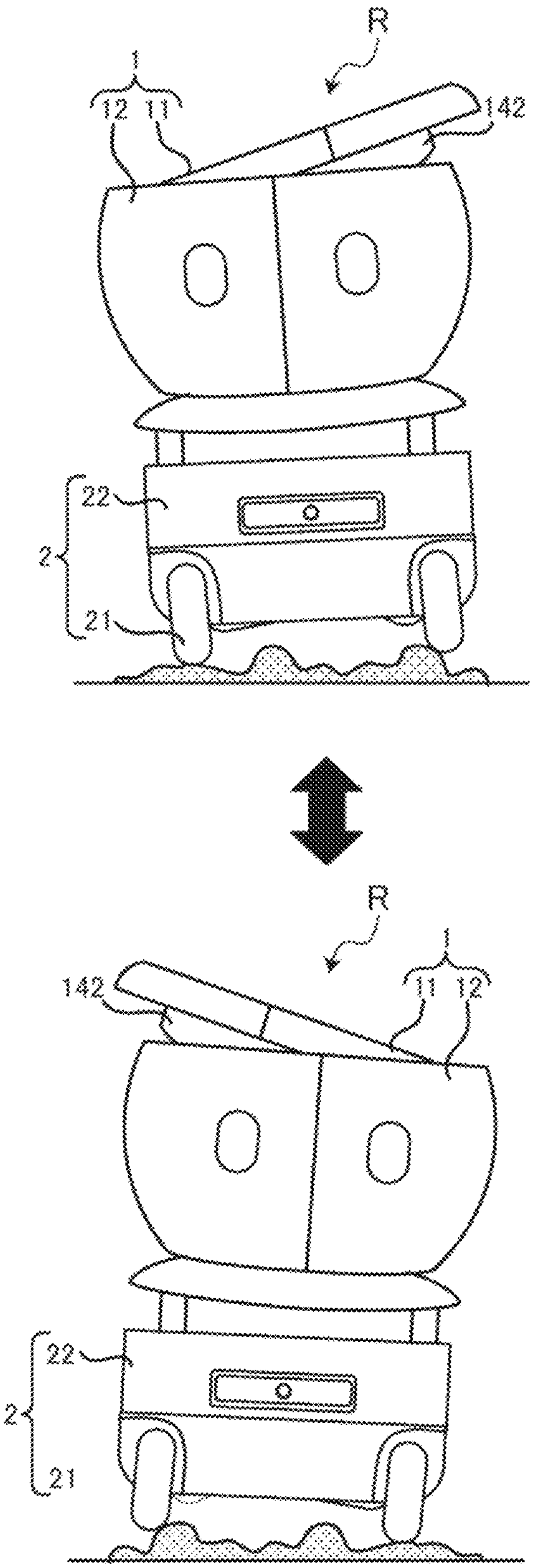
FIGS. 3A and 3B are schematic diagrams showing an example of a case where a pendulum ECU according to the embodiment controls a top plate of an upper unit in conjunction with a traveling unit.
Figure 3B:
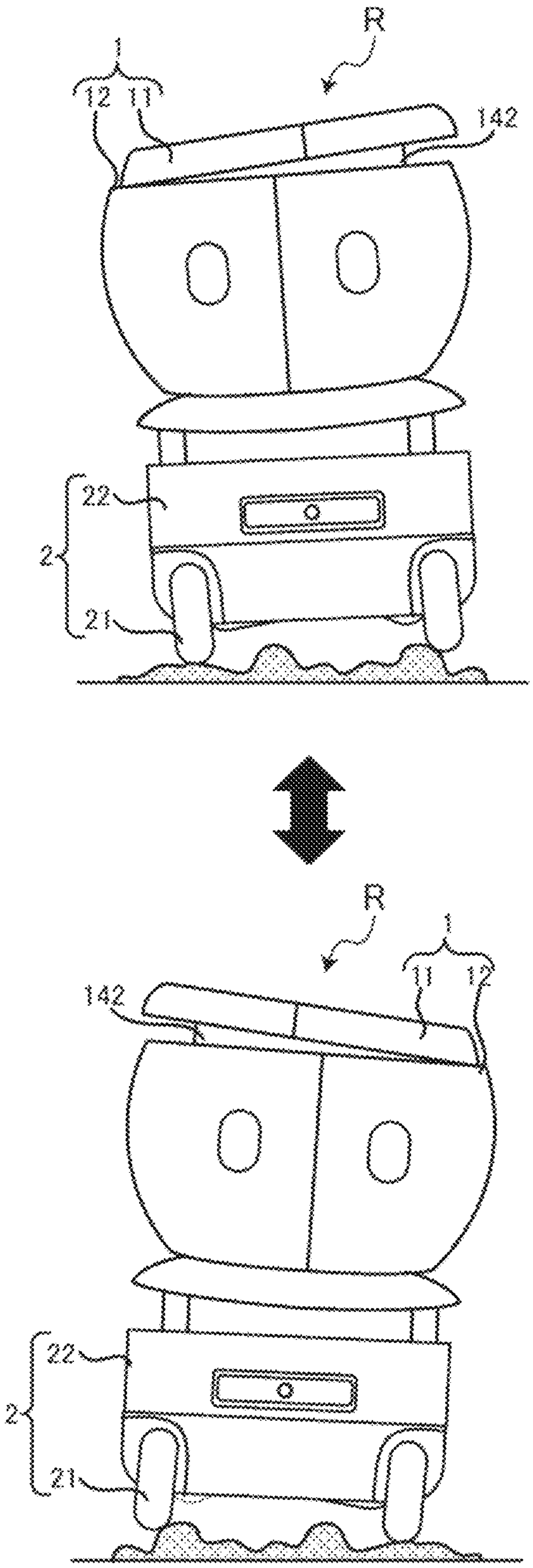

FIGS. 3A and 3B are schematic diagrams showing an example of a case where the pendulum ECU 147 according to the embodiment controls the top plate 11 of the upper unit 1 in conjunction with the traveling unit 2.

As shown in FIG. 3, it is assumed that the autonomous traveling robot R is traveling, for example, on a rough road having unevenness. At this time, the pendulum ECU 147 acquires information indicating that the autonomous traveling robot R is traveling straight in the front-rear direction from the traveling ECU 125. The information indicating that the autonomous traveling robot R is traveling straight is transmitted from the traveling ECU 125 to the pendulum ECU 147 as, for example, a control signal transmitted from the traveling ECU 125 to the traveling unit 2, or a detection signal transmitted from the position sensor 123 that detects the turning angle of the drive wheel 21 or the like to the traveling ECU 125.

While the autonomous traveling robot R is traveling on a rough road, acceleration in the front-rear direction that is a traveling direction of the traveling unit 2 acts on the upper unit 1, and acceleration in the left-right directions also occurs in the upper unit 1 due to swing of the autonomous traveling robot R in the left-right direction.

As shown in FIG. 3A, the pendulum ECU 147 controls the front-rear pendulum mechanism 141 based on acceleration in the front-rear direction detected by the acceleration sensor 146 to cause the top plate 11 to perform pendulum motion in the front-rear direction. In parallel with this, the pendulum ECU 147 controls the left-right pendulum mechanism 142 based on acceleration in the left-right direction detected by the acceleration sensor 146 to cause the top plate 11 to perform pendulum motion in the left-right direction.

There is a case where a control speed of the left-right pendulum mechanism 142 cannot keep up with lateral vibrations caused by unevenness or the like of a traveling path. In this case, pendulum motion of the top plate 11 in the left-right direction is opposite to an actual vibration direction, and the upper unit 1 may become unstable.

In the embodiment, when the upper unit 1 is vibrating laterally due to unevenness in the traveling path or the like, and the acceleration sensor 146 detects acceleration occurred in the upper unit 1 in a direction different from a traveling direction of the traveling unit 2, the pendulum ECU 147 reduces a gain for the acceleration in the direction different from the traveling direction.

As shown in FIG. 3B, in this case, after the gain is reduced, pendulum motion of the top plate 11 with respect to the acceleration having a predetermined magnitude becomes smaller than that before the gain is reduced. That is, a reaction to the acceleration in the direction different from the traveling direction is intentionally blunted, and thus the upper unit 1 is prevented from becoming unstable.

Figure 4:
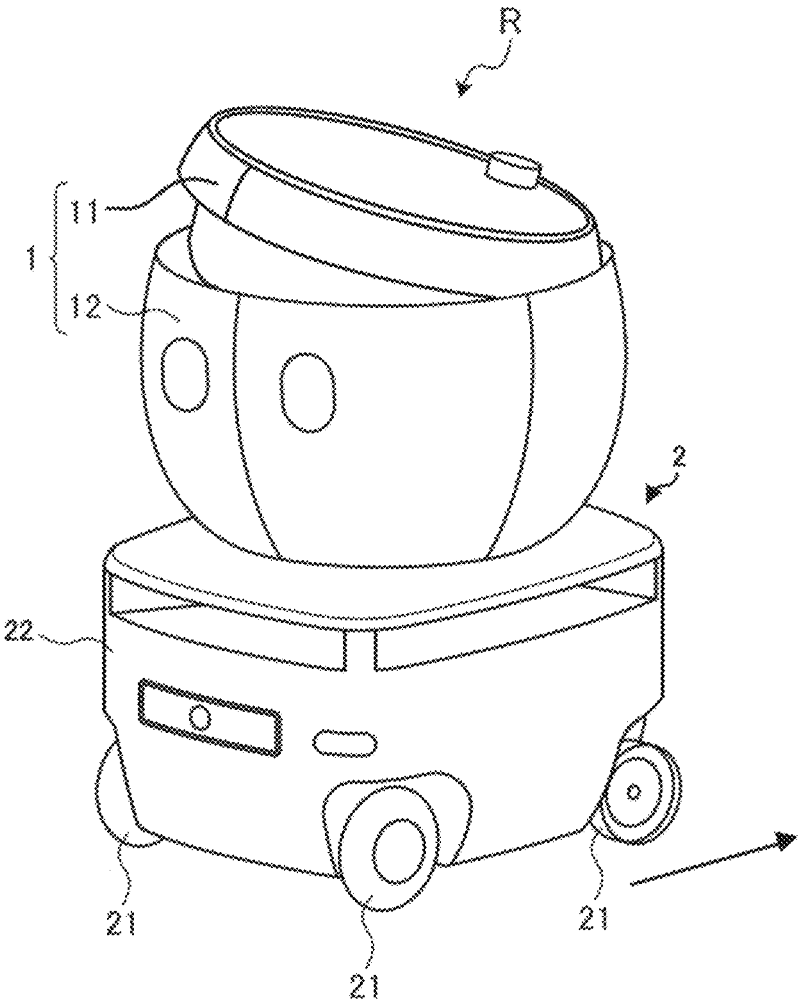
FIG. 4 is a schematic diagram showing an example of a case where a traveling ECU according to the embodiment controls the traveling unit in conjunction with the upper unit.

FIG. 4 is a schematic diagram showing an example of a case where the traveling ECU 125 according to the embodiment controls the traveling unit 2 in conjunction with the upper unit 1.

As shown in FIGS. 3A and 3B, it is assumed that the pendulum ECU 147 controls, for example, the front-rear pendulum mechanism 141 to cause the top plate 11 of the upper unit 1 to perform pendulum motion in the front-rear direction, for example, to swing a front end portion of the top plate 11 upward.

At this time, the traveling unit 2 acquires, from the pendulum ECU 147, information indicating that the top plate 11 is performing the pendulum motion in the front-rear direction. The information indicating that the top plate 11 is performing the pendulum motion in the front-rear direction is transmitted from the pendulum ECU 147 to the traveling ECU 125 as, for example, a control signal transmitted from the pendulum ECU 147 to the front-rear pendulum drive unit 144, a detection signal transmitted from the position sensor 145 that detects a rotation angular velocity of the front-rear pendulum mechanism 141 to the pendulum ECU 147, and a detection signal transmitted from the acceleration sensor 146 that detects acceleration occurred in the pendulum mechanism 14 to the pendulum ECU 147.

At this time, backward acceleration acts on the traveling unit 2. That is, for example, when the autonomous traveling robot R is stopped, the traveling unit 2 may move backward due to a reaction to an operation of the top plate 11.

In the embodiment, when the pendulum ECU 147 proactively operates the top plate 11, the traveling ECU 125 controls the traveling unit 2 to cancel out an effect of a reaction generated in the traveling unit 2. For example, as described above, when the autonomous traveling robot R is stopped and the operation of swinging the front end portion of the top plate 11 upward is performed, the traveling ECU 125 can control the traveling unit 2 to lock the drive wheels 21.

Processing Example of Pendulum ECU and Traveling ECU

Figure 5:
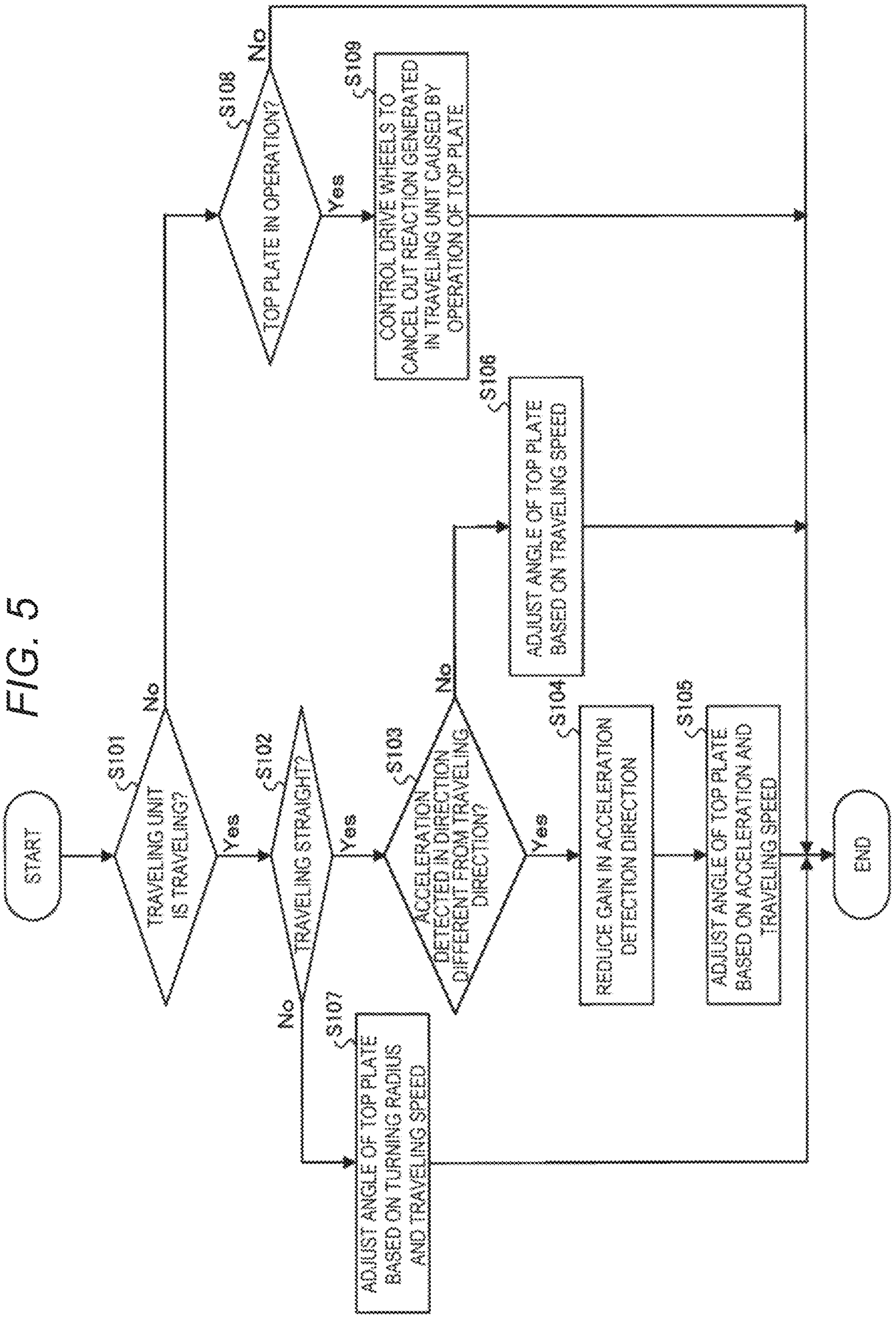
FIG. 5 is a flow diagram showing an example of a procedure of control processing of the autonomous traveling robot executed by the pendulum ECU and the traveling ECU according to the embodiment.

Next, a processing example executed by the pendulum ECU 147 and the traveling ECU 125 in the embodiment will be described with reference to FIG. 5. FIG. 5 is a flow diagram showing an example of a procedure of control processing of the autonomous traveling robot R executed by the pendulum ECU 147 and the traveling ECU 125 according to the embodiment.

As shown in FIG. 5, the pendulum ECU 147 communicates with the traveling ECU 125 using, for example, a CAN, and monitors whether the traveling unit 2 is traveling (step S101). When the traveling unit 2 is traveling (step S101: Yes), the pendulum ECU 147 determines whether the traveling unit 2 is traveling straight based on information acquired from the traveling ECU 125 (step S102).

When the traveling unit 2 is traveling with turning such as turning right or left (step S102: No), the pendulum ECU 147 controls the pendulum mechanism 14 based on a turning radius and a traveling speed of the traveling unit 2 to adjust an angle of the top plate 11 so that the acceleration applied to the upper unit 1 is cancelled out (step S107).

When the traveling unit 2 is traveling straight (step S102: Yes), the pendulum ECU 147 monitors a detection result of the acceleration sensor 146, for example, and monitors whether acceleration is detected in a direction different from a traveling direction of the traveling unit 2 (step S103). If the acceleration in the direction different from the traveling direction is not detected (step S103: No), the pendulum ECU 147 exclusively controls the front-rear pendulum mechanism 141 based on the traveling speed of the traveling unit 2 traveling straight, and adjusts an angle of the top plate 11 so that the acceleration applied to the upper unit 1 is cancelled out (step S106).

When the acceleration in the direction different from the traveling direction is detected (step S103: Yes), the pendulum ECU 147 reduces a gain for the acceleration of the pendulum mechanism 14 in the direction in which the acceleration is detected (step S104). Accordingly, the gain of the left-right pendulum drive unit 143 exclusively for the acceleration in the left-right direction is reduced, and pendulum motion in the left-right direction of the top plate 11 caused by the left-right pendulum mechanism 142 is prevented.

Then, the pendulum ECU 147 controls the pendulum mechanism 14 based on the acceleration in the direction different from the traveling direction applied to the upper unit 1 and the traveling speed of the traveling unit 2 to adjust an angle of the top plate 11 so that the acceleration applied to the upper unit 1 is cancelled out (step S105). That is, acceleration in the direction different from the traveling direction is exclusively cancelled out by the left-right pendulum mechanisms 142, and acceleration in the front-rear direction caused by the straight traveling of the traveling unit 2 is exclusively cancelled out by the front-rear pendulum mechanism 141.

On the other hand, for example, if the traveling unit 2 is stopped (step S101: No), the traveling ECU 125 communicates with the pendulum ECU 147 via, for example, the CAN, and monitors whether the top plate 11 of the upper unit 1 is in operation (step S108).

If the top plate 11 is in operation (step S108: Yes), based on information acquired from the pendulum ECU 147, the traveling ECU 125 controls the drive wheel 21, for example, by locking the drive wheel 21, so as to cancel out a reaction generated in the traveling unit 2 caused by the operation of the top plate 11 (step S109). When the top plate 11 is stopped (step S108: No), the traveling ECU 125 skips the processing of step S109.

As described above, the processing executed by the pendulum ECU 147 and the traveling ECU 125 according to the embodiment ends.

Overview

For example, in the autonomous traveling robot including the upper unit and the traveling unit, the autonomous traveling robot is developed that includes, in the upper unit, the pendulum mechanism or the like that reduces and stabilizes acceleration occurred in the upper unit. However, when the autonomous traveling robot travels on a rough road having unevenness, the acceleration may be applied to the upper unit in a direction other than the traveling direction of the autonomous traveling robot, for example in the left-right direction, and a control speed of the pendulum mechanism may not be able to keep up with the acceleration. For example, when the pendulum mechanism is proactively operated regardless of a motion state of the traveling unit, the traveling unit may be affected by the operation of the pendulum mechanism.

According to the autonomous traveling robot R in the embodiment, the traveling ECU 125 and the pendulum ECU 147 acquire information indicating motion states of each other's units, and control the traveling unit 2 and the upper unit 1 such that the units operate in conjunction with each other based on the acquired information. Accordingly, it is possible to prevent an influence on the traveling unit 2 and the upper unit 1 by a motion state of each other.

According to the autonomous traveling robot R in the embodiment, the pendulum ECU 147 controls, when acquiring information indicating that the traveling unit 2 is traveling straight, the upper unit 1 such that the upper unit 1 operates in conjunction with the traveling unit 2 based on the information on the straight traveling. Accordingly, it is possible to prevent the pendulum mechanism 14 from reacting excessively to vibrations associated with traveling of the traveling unit 2, and to further stabilize the upper unit 1.

According to the autonomous traveling robot R in the embodiment, the pendulum ECU 147 controls, when acceleration occurred in the upper unit 1 is detected in a direction different from a traveling direction of the traveling unit 2 when the traveling unit 2 is traveling straight, the pendulum mechanism 14 by reducing a gain for the acceleration in the direction in which the acceleration is detected. Accordingly, for example, even when the autonomous traveling robot R is traveling on a rough road, the autonomous traveling robot R can be allowed to travel by further stabilizing the upper unit 1.

According to the autonomous traveling robot R in the embodiment, the traveling ECU 125 controls, when acquiring information indicating that the top plate 11 is performing the pendulum motion, the traveling unit 2 such that the traveling unit 2 operates in conjunction with the upper unit 1 based on the information on the pendulum motion of the top plate 11. Accordingly, it is possible to prevent the traveling unit 2 from being affected by the motion of the upper unit 1.

Modification

Next, an autonomous traveling robot R2 according to a modification of the embodiment will be described with reference to FIGS. 6A to 7. The autonomous traveling robot R2 according to the modification causes the top plate 11 to perform pendulum motion even while traveling on a slope. In the following drawings, configurations similar to those of the above-described embodiment are denoted by the same reference signs, and description thereof may be omitted.

Figure 6A:
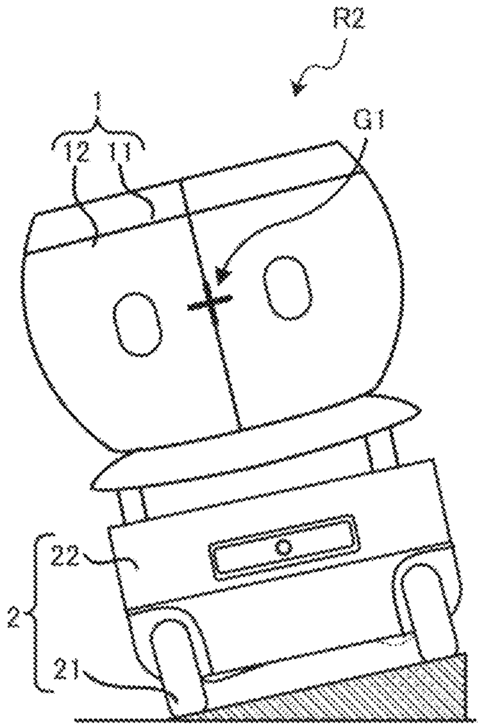
FIGS. 6A and 6B are schematic diagrams showing an example of a case where a pendulum ECU according to a modification of the embodiment controls a top plate of an upper unit in conjunction with a traveling unit.
Figure 6B:
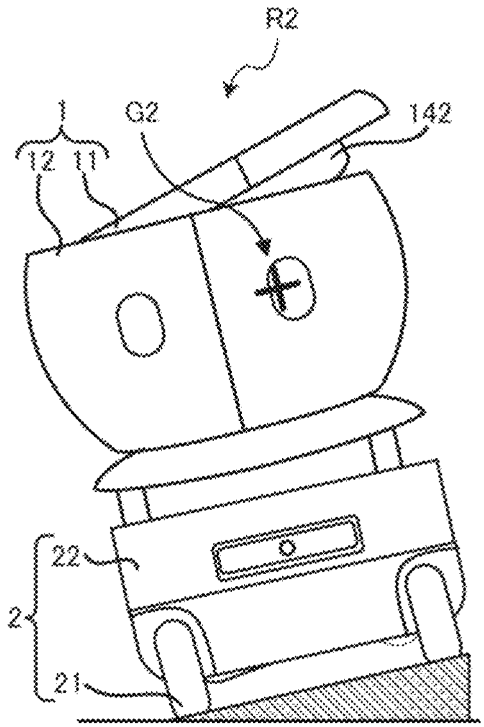

FIGS. 6A and 6B are schematic diagrams showing an example of a case where the pendulum ECU according to the modification of the embodiment controls the top plate 11 of the upper unit 1 in conjunction with the traveling unit 2.

As shown in FIGS. 6A and 6B, it is assumed that the autonomous traveling robot R2 is traveling on a slope that is inclined on one side in the left-right direction. In the slope shown in FIGS. 6A and 6B, a right side of the autonomous traveling robot R2 is lower than a left side. Accordingly, the autonomous traveling robot R2 is traveling straight while tilting to the right. As shown in FIG. 6A, on such a slope, when the top plate 11 is at an initial position, that is, at a position where the top plate 11 is horizontal with respect to the main body 12 without operating the pendulum mechanism 14, a center of gravity G1 of the upper unit 1 is on the right side with respect to a center position of the traveling unit 2 in the left-right direction. If such a deviation exceeds a predetermined amount, the autonomous traveling robot R2 may fall to the right side.

As shown in FIG. 6B, when a pendulum ECU in the modification detects that the autonomous traveling robot R2 is tilted at an angle equal to or larger than a predetermined angle in a direction different from the traveling direction, the pendulum ECU tilts the top plate 11 so as to prevent the autonomous traveling robot R2 from falling over. Such a tilt of the autonomous traveling robot R2 can be determined by the position sensor 145 detecting the tilt of the top plate 11, for example, even when the top plate 11 is at the initial position. The determination of the tilt of the top plate 11 can be performed, for example, when an angle is equal to or larger than a predetermined angle at which the autonomous traveling robot R2 may fall over. The predetermined angle may be changed each time, taking into account the traveling speed or the like of the traveling unit 2.

In the example in FIG. 6B, the pendulum ECU in the modification controls the left-right pendulum mechanisms 142 to lift up a left end portion of the top plate 11, which is on a side opposite to a tilt direction of the autonomous traveling robot R2 among end portions of the top plate 11 in the left-right direction. Accordingly, a center of gravity G2 of the upper unit 1 shifts to the left side, and is positioned so as to overlap in the upper-lower direction the center position of the traveling unit 2 in the left-right direction. Accordingly, the autonomous traveling robot R2 is prevented from falling to the right side.

Figure 7:
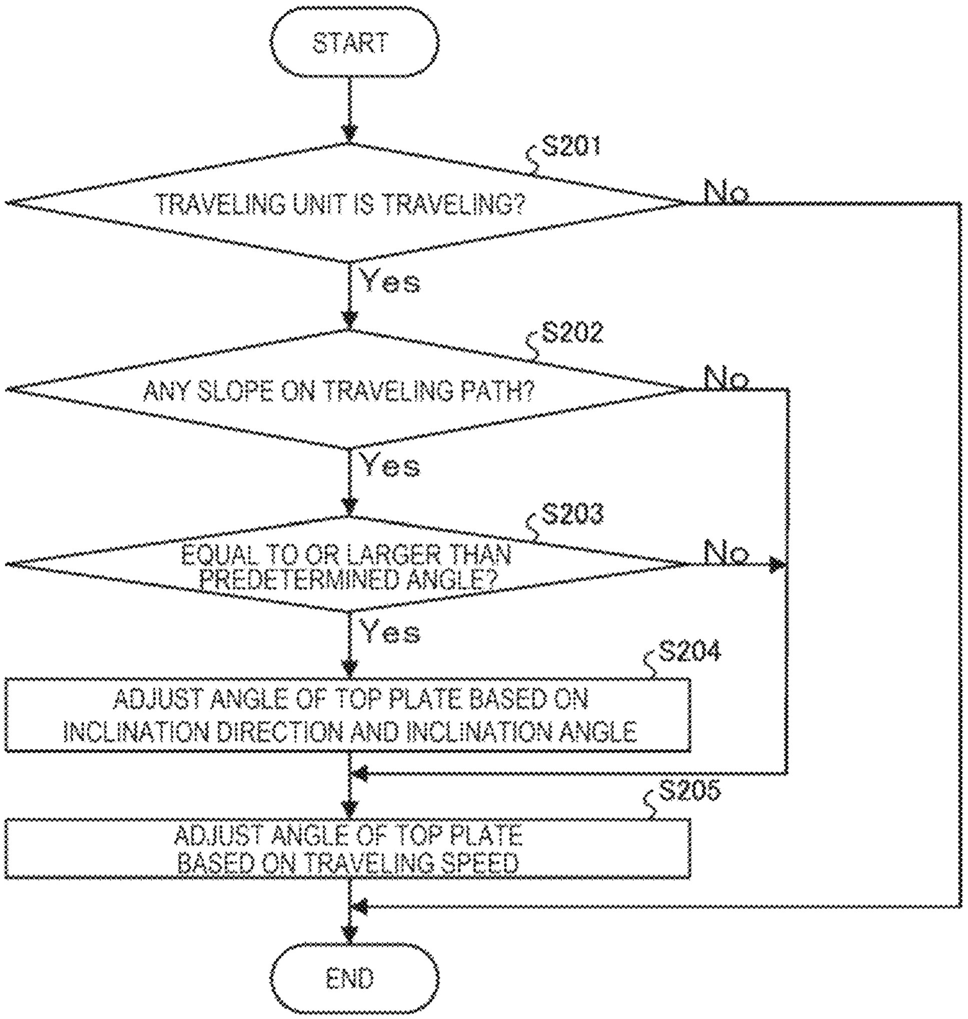
FIG. 7 is a flow diagram showing an example of a procedure of control processing of an autonomous traveling robot executed by the pendulum ECU and a traveling ECU according to the modification of the embodiment.

FIG. 7 is a flow diagram showing an example of a procedure of control processing of the autonomous traveling robot R2 executed by the pendulum ECU and the traveling ECU according to the modification of the embodiment.

As shown in FIG. 7, the pendulum ECU in the modification communicates with the traveling ECU using, for example, a CAN, and monitors whether the traveling unit 2 is traveling (step S201). When the traveling unit 2 is traveling (step S201: Yes), the pendulum ECU in the modification determines whether a traveling path is inclined in a direction different from a traveling direction of the traveling unit 2 (step S202). That is, the pendulum ECU in the modification monitors a detection result of the position sensor 145, for example, and monitors whether the autonomous traveling robot R2 is tilted in a direction different from the traveling direction of the traveling unit 2.

When the traveling path is inclined in the direction different from the traveling direction (step S202: Yes), the pendulum ECU in the modification determines whether an inclination angle of the traveling path is equal to or larger than a predetermined angle (step S203).

When the inclination angle of the traveling path is equal to or larger than the predetermined angle (step S203: Yes), the pendulum ECU in the modification controls, based on an inclination direction and an inclination angle at this time, the pendulum mechanism 14 to adjust an angle of the top plate 11, so as to prevent the autonomous traveling robot R2 from falling over in an inclination direction (step S204). Accordingly, the angle of the top plate 11 is adjusted in the left-right direction exclusively by the left-right pendulum drive unit 143, and the falling of the autonomous traveling robot R2 is prevented.

After adjusting the angle of the top plate 11 in this manner, the pendulum ECU in the modification further controls the pendulum mechanism 14 based on a traveling speed of the traveling unit 2 to adjust the angle of the top plate 11 so that acceleration applied to the upper unit 1 caused by the traveling of the traveling unit 2 is cancelled out (step S205). That is, acceleration caused by the traveling of the traveling unit 2 is exclusively cancelled out by the front-rear pendulum mechanism 141.

On the other hand, for example, if the traveling unit 2 is stopped (step S201: No), the pendulum ECU in the modification skips the processing of steps S202 to S205.

If the traveling path does not have a tilt in a direction different from the traveling direction (step S202: No), or if the tilt of the traveling path in a direction different from the traveling direction is less than the predetermined angle (step S203: No), the pendulum ECU in the modification skips the processing of steps S202 to S204 and adjusts the angle of the top plate 11 so that the acceleration caused by the traveling of the traveling unit 2 is cancelled out (step S205).

As described above, the processing executed by the pendulum ECU and the traveling ECU according to the modification ends.

According to the autonomous traveling robot R2 in the modification, when the traveling unit 2 is traveling straight and a tilt in a direction different from the traveling direction of the traveling unit 2 is detected, the pendulum ECU in the modification controls the pendulum mechanism 14 to correct a deviation of a center of gravity of the upper unit 1 relative to the traveling unit 2 caused by the tilt. Accordingly, it is possible to prevent the autonomous traveling robot R2 from falling over on a slope.

The autonomous traveling robot R2 in the modification has similar effects as those of the autonomous traveling robot R in the embodiment.

An autonomous mobile body according to the present embodiment includes: a traveling unit including a drive wheel and a chassis and configured to travel straight forward and backward and turn left and right; an upper unit disposed at an upper portion of the traveling unit and including a vibration damping mechanism configured to damp a vibration caused by the straight traveling and the turning of the traveling unit; a first control unit configured to control the traveling unit; and a second control unit configured to control the upper unit, in which the first control unit and the second control unit acquire information indicating motion states of each other's units, and control the traveling unit and the upper unit such that the units operate in conjunction with each other based on the acquired information.

According to the present embodiment, it is possible to prevent an influence of the traveling unit and the upper unit by a motion state of each other.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An autonomous mobile body comprising:

a traveling unit including a drive wheel and a chassis and configured to travel straight forward and backward and turn left and right;

an upper unit disposed at an upper portion of the traveling unit and including a vibration damping mechanism configured to damp a vibration caused by the straight traveling and the turning of the traveling unit;

a first controller configured to control the traveling unit; and a second controller configured to control the upper unit, wherein the first controller acquires information indicating a motion state of the upper unit and the second controller acquires information indicating a motion state of the traveling unit, the first controller controls the traveling unit based on the motion state information of the upper unit, and the second controller controls the upper unit based on the motion state information of the traveling unit.

2. The autonomous mobile body according to claim 1, wherein the second controller controls, when acquiring motion information indicating that the traveling unit is traveling straight, the upper unit such that the upper unit operates in conjunction with the traveling unit based on the motion information on the straight traveling.

3. The autonomous mobile body according to claim 2, wherein the second controller controls, when acceleration occurred in the upper unit is detected in a direction different from a traveling direction of the traveling unit when the traveling unit is traveling straight, the vibration damping mechanism by reducing a gain for the acceleration in the direction in which the acceleration is detected.

4. The autonomous mobile body according to claim 1, wherein the vibration damping mechanism includes a pendulum mechanism for pendulum motion of a top plate disposed in the upper unit, and the first controller controls, when acquiring motion information indicating that the top plate is performing the pendulum motion, the traveling unit such that the traveling unit operates in conjunction with the upper unit based on the information on the pendulum motion of the top plate.

* * * * *